US012800548B2

(12) United States Patent
Yamaguchi et al.

(10) Patent No.: US 12,800,548 B2
(45) Date of Patent: Nov. 17, 2026

(54) COIL MODULE, ARRAY PROBE, EDDY CURRENT TESTING DEVICE

(71) Applicant: MITSUBISHI HEAVY INDUSTRIES, LTD., Tokyo (JP)

(72) Inventors: Takehiko Yamaguchi, Tokyo (JP); Kentaro Jinno, Tokyo (JP); Mikiyasu Urata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 120 days.

(21) Appl. No.: 19/106,851

(22) PCT Filed: Feb. 17, 2023

(86) PCT No.: PCT/JP2023/005810
§ 371 (c)(1),
(2) Date: Feb. 26, 2025

(87) PCT Pub. No.: WO2024/047903
PCT Pub. Date: Mar. 7, 2024

(65) Prior Publication Data

US 2026/0063589 A1 Mar. 5, 2026

(30) Foreign Application Priority Data

Aug. 30, 2022 (JP) ................................ 2022-136509

(51) Int. Cl.
*G01N 27/904* (2021.01)
*G01N 27/90* (2021.01)
(Continued)

(52) U.S. Cl.
CPC ....... *G01N 27/904* (2013.01); *G01N 27/9006* (2013.01); *G01N 27/902* (2013.01); *G01N 27/9093* (2013.01); *H01F 27/306* (2013.01)

(58) Field of Classification Search
CPC .. G01N 27/904; G01N 27/90; G01N 27/9013; G01N 27/9093; H01F 27/30
See application file for complete search history.

(56) References Cited

U.S. PATENT DOCUMENTS

2013/0076349 A1* 3/2013 Kurokawa ............ G01N 27/90 324/240

FOREIGN PATENT DOCUMENTS

JP 6288640 B2 3/2018
JP 6334267 B2 5/2018

OTHER PUBLICATIONS

International Search Report issued in corresponding International Application No. PCT/JP2023/005810 mailed Mar. 20, 2023 (4 pages).

(Continued)

*Primary Examiner* — Neel D Shah

(74) *Attorney, Agent, or Firm* — Osha Bergman Watanabe & Burton LLP

(57) ABSTRACT

A coil module includes: a cross coil that includes a first coil having an annular shape centered on a first axis line, and a second coil having an annular shape centered on a second axis line intersecting the first axis line and covering a part of an outer peripheral side of the first coil; and a case that includes a first insertion point extending in a first axis line direction and into which the first coil is inserted and a second insertion point extending in a second axis line direction and into which the second coil is inserted.

9 Claims, 5 Drawing Sheets

(51) Int. Cl.
*G01N 27/9013* (2021.01)
*G01N 27/9093* (2021.01)
*H01F 27/30* (2006.01)

(56) References Cited

OTHER PUBLICATIONS

Written Opinion issued in corresponding International Application No. PCT/JP2023/005810 mailed Mar. 20, 2023 (6 pages).

* cited by examiner

COIL MODULE, ARRAY PROBE, EDDY CURRENT TESTING DEVICE

TECHNICAL FIELD

The present disclosure relates to a coil module, an array probe, and an eddy current testing device.

Priority is claimed on Japanese Patent Application No. 2022-136509 filed on Aug. 30, 2022, the content of which is incorporated herein by reference.

BACKGROUND ART

An eddy current testing method is known as a method for non-destructively inspecting defects such as flaws and thinning in a pipe and the like. In this method, a cross coil including an excitation coil that generates an eddy current from an inner surface to an outer surface of a pipe, a detection coil that detects a disturbance of the eddy current generated at a defective part of the pipe, and a winding frame around which the winding of the excitation coil and the winding of the detection coil are wound is generally used in the related art (for example, see PTL 1).

In order to manufacture the cross coil, a method for alternately winding the winding of the excitation coil and the winding of the detection coil around the above-described winding frame is employed. That is, it is necessary to repeat the work of winding the winding of the excitation coil, and then winding the winding of the detection coil in a direction intersecting the excitation coil.

CITATION LIST

Patent Literature

[PTL 1] Japanese Patent No. 6288640

SUMMARY OF INVENTION

Technical Problem

However, in a case where the cross coil is manufactured using the above-described winding frame, it is difficult to automate the work, and problems arise such as an increase in cost required for manufacturing and an increase in manufacturing period. In particular, in a case of creating an array probe for eddy current testing that requires a large number of cross coils, the period required for manufacturing the cross coils has become a significant bottleneck.

The present disclosure has been made to solve the above-described problems, and an object of the present disclosure is to provide a coil module, an array probe, and an eddy current testing device that can be manufactured at a low cost and in a short time.

Solution to Problem

In order to solve the above-described problem, according to the present disclosure, there is provided a coil module including: a cross coil that includes a first coil having an annular shape centered on a first axis line, and a second coil having an annular shape centered on a second axis line intersecting the first axis line and covering a part of an outer peripheral side of the first coil; and a case that includes a first insertion point extending in a first axis line direction and into which the first coil is inserted and a second insertion point extending in a second axis line direction and into which the second coil is inserted.

According to the present disclosure, there is provided an array probe including: a plurality of the coil modules that are arranged in a first arrangement direction intersecting the first axis line and the second axis line and extending in the same plane; and a holding member that supports the plurality of coil modules and is formed of an elastically deformable material.

According to the present disclosure, there is provided an eddy current testing device including: the array probe; a power supply unit that supplies an alternating current to each of the first coil and the second coil; and a switch unit that switches a supply state of the alternating current between a mutual induction standard comparison method in which one of the first coil and the second coil operates as an excitation coil that generates an eddy current and the other operates as a detection coil that detects a flaw due to a disturbance of the eddy current, and a self-induction self-comparison method in which each of the first coil and the second coil operates as the excitation coil that generates the eddy current and as the detection coil that detects the flaw due to the disturbance of the eddy current.

Advantageous Effects of Invention

According to the present disclosure, it is possible to provide a coil module, an array probe, and an eddy current testing device that can be manufactured at a low cost and in a short time.

DESCRIPTION OF EMBODIMENTS

Hereinafter, an eddy current testing device 1, an array probe 10, and a coil module 20 according to an embodiment of the present disclosure will be described with reference to FIGS. 1 to 7.

Configuration of Eddy Current Testing Device

The eddy current testing device 1 is a device for detecting a defect (cracks or thinning) generated in a target object by scanning along the surface of the target object, for example, in a butt weld portion or a fillet weld portion of a plant member and a straight pipe portion or an elbow portion of a pipe in nuclear power plant.

Figure 1:
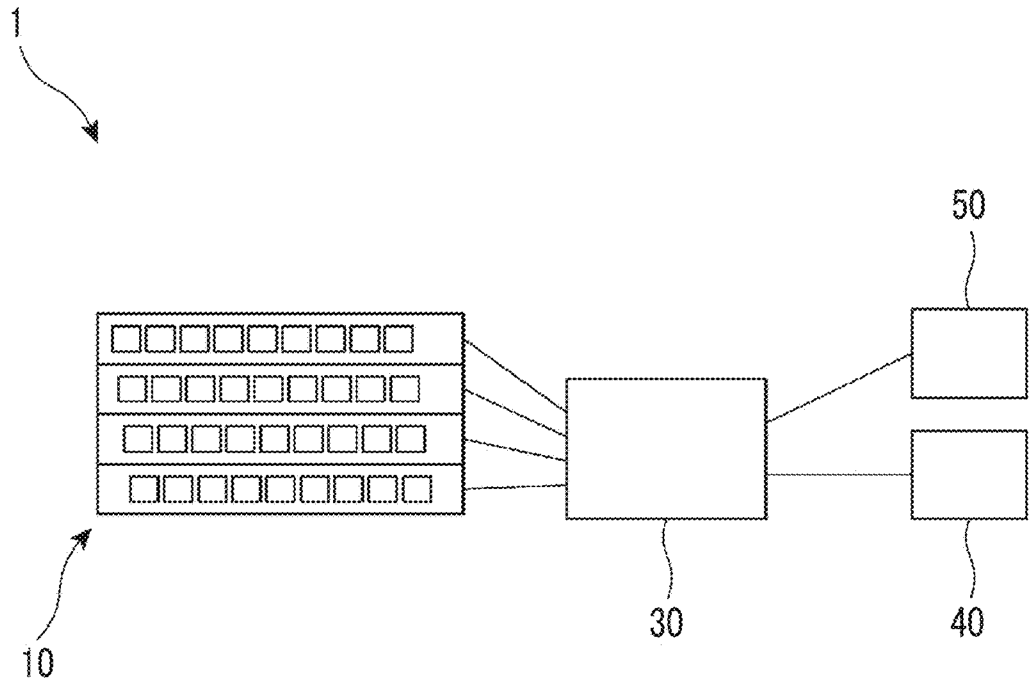
FIG. 1 is a schematic view showing a configuration of an eddy current testing device according to an embodiment of the present disclosure.

As shown in FIG. 1, the eddy current testing device 1 includes the array probe 10, a switch unit 30, a power supply unit 40, and a data acquisition unit main body 50.

The array probe 10 is used, for example, by being disposed on a weld portion and scanning the weld portion. The power supply unit 40 applies an alternating current voltage to the array probe 10, and generates an alternating current in the coil module 20 which will be described later. By scanning the array probe 10 along the surface of the weld portion or the like, a disturbance occurs in the eddy current generated from the coil module 20 in a case where the array probe 10 passes through a defective part. The data acquisition unit main body 50 is a device that converts the disturbance of the eddy current into a numerical value or an image and visually transmits the result to an operator. The switch unit 30 is a device that switches a supply state of an alternating current flowing through the coil module 20 (a method for excitation and detection in the coil constituting the coil module 20). The switching of the operation method by means of the switch unit 30 will be described later.

Configuration of Array Probe

Figure 2:
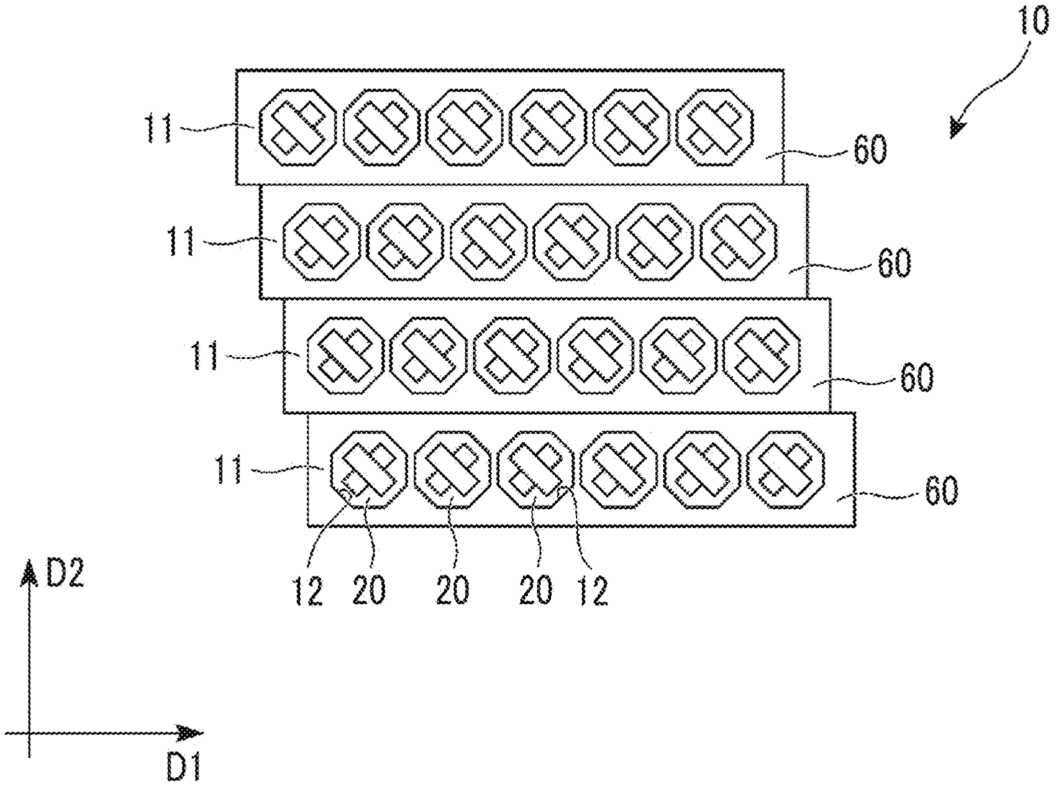
FIG. 2 is a plan view showing a configuration of an array probe according to the embodiment of the present disclosure.

As shown in FIG. 2, the array probe 10 has a plurality of probe columns 60. Each probe column 60 extends in a first arrangement direction D1. The plurality of probe columns 60 are arranged closely together in a second arrangement direction D2 orthogonal to the first arrangement direction D1 with a plurality of columns (four in the example of FIG. 2).

The probe column 60 has a plurality of coil modules 20 and a holding member 11 that holds the coil modules 20. The coil modules 20 are arranged in a plurality of rows at small intervals in the first arrangement direction D1. The holding member 11 holds the plurality of coil modules 20 arranged in this manner in a state in which the postures and the arrangement positions of the plurality of coil modules 20 are maintained. The holding member 11 is integrally formed of a resin material that is easily elastically deformable, such as an elastomer or polyvinyl chloride. That is, the holding member 11 can conform closely to a curved surface of, for example, a pipe or a weld portion without a gap by being pressed from the outside. In addition, in a case where the pressing force is released, it is possible to restore the shape to the initial shape due to the elastic restoring force. In other words, the holding member 11 has flexibility.

A plurality of insertion points 12 recessed in a direction (a third axis line A3 direction, which will be described later) orthogonal to the first arrangement direction D1 and the second arrangement direction D2 are formed in the holding member 11 (bottom portions of the insertion points 12 in the third axis line A3 direction may be penetrated). The insertion points 12 are arranged in the first arrangement direction D1 at small intervals. The insertion point 12 has an octagonal opening shape. The coil module 20 is fitted into the insertion point 12. More specifically, an inner surface of the insertion point 12 is elastically deformed by pushing the coil module 20 into the insertion point 12, and the coil module 20 is held within the insertion point 12 by a restoring force based on the elastic deformation. Further, the positions of the coil modules 20 in the first arrangement direction D1 are different from each other in a pair of probe columns 60 adjacent to each other in the second arrangement direction D2. That is, the positions of the coil modules 20 in the first arrangement direction D1 are slightly deviated for each probe column 60, so that the gaps between the coil modules 20 are covered. This is to prevent overlooking of defective parts due to the occurrence of gaps between the coil modules 20.

In FIGS. 1 and 2, although an example in which the probe columns 60 of the holding member 11 are divided into a plurality of pieces is shown, the embodiment is not limited to this, and one holding member 11 can also be configured by a plurality of probe columns 60 formed integrally.

Configuration of Coil Module

Figure 3:
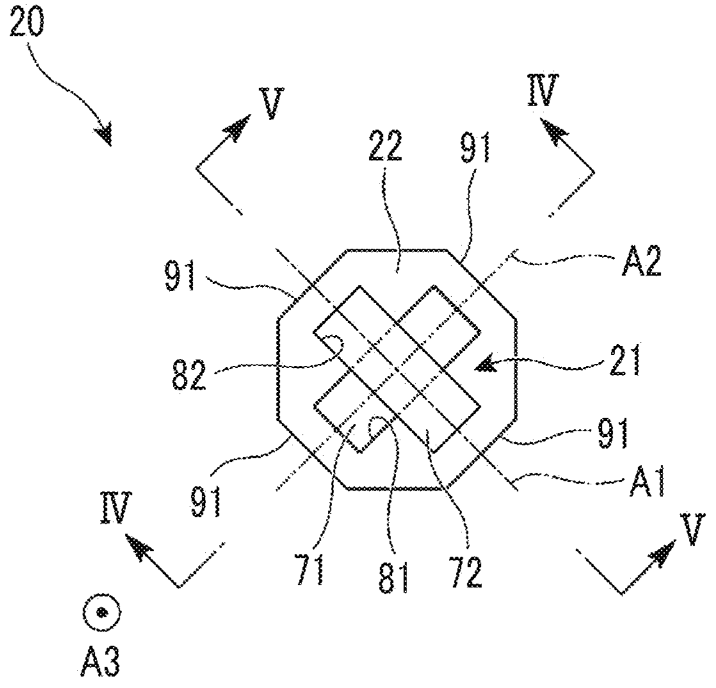
FIG. 3 is a plan view showing a configuration of a coil module according to the embodiment of the present disclosure.

As shown in FIG. 3, the coil module 20 has a cross coil 21 and a case 22. The cross coil 21 has a first coil 71 and a second coil 72. The first coil 71 has a rectangular annular shape centered on a first axis line A1. The second coil 72 has a rectangular annular shape centered on a second axis line A2 orthogonal to the first axis line A1. An inner opening dimension of the second coil 72 is set to be the same as or slightly larger than an outer dimension of the first coil 71. That is, the first coil 71 is in a state of being inserted into the inner opening of the second coil 72.

Desirably, the first coil 71 and the second coil 72 are orthogonal to each other at a center portion in the first axis line A1 direction and the second axis line A2 direction. However, even in a case where the central portions of the first coil 71 and the second coil 72 are slightly deviated, the detection accuracy is not affected or is only slightly affected. Therefore, the dimensional accuracy of the case 22, which will be described later, may also include a manufacturing error that is large enough to allow for such a deviation. In addition, the shapes of the first coil 71 and the second coil 72 are not limited to a rectangular annular shape, and may be a circular annular shape.

Figure 4:
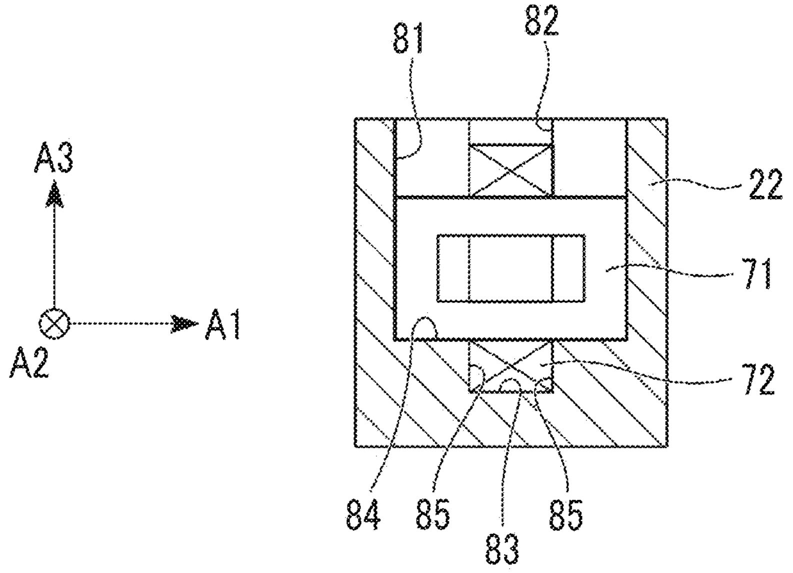
FIG. 4 is a cross-sectional view taken along line IV-IV of FIG. 3.

The case 22 is a member for maintaining the shape and the posture of the cross coil 21 by holding the cross coil 21 from the outer side. The case 22 has a first insertion point 81 and a second insertion point 82. The first coil 71 is inserted into the first insertion point 81, and the second coil 72 is inserted into the second insertion point 82. As shown in FIG. 4, the first insertion point 81 is a groove that extends in the second axis line A2 direction and is recessed in the third axis line A3 direction orthogonal to the first axis line A1 and the second axis line A2. In a case of being viewed from the third axis line A3 direction, the first insertion point 81 has a rectangular shape corresponding to a projection shape of the first coil 71. The dimension of the first insertion point 81 in the second axis line A2 direction is set to be the same as or slightly larger than the dimension of the first coil 71. The dimension of the first insertion point 81 in the first axis line A1 direction is set to be the same as or slightly larger than the dimension of the first coil 71 in the first axis line A1 direction. The dimension of the first insertion point 81 in the third axis line A3 direction is set to be larger than the dimension of the first coil 71 in the third axis line A3 direction. That is, in a state in which the first coil 71 is inserted into the first insertion point 81, a space is formed on one side in the third axis line A3 direction of the first coil 71.

Figure 5:
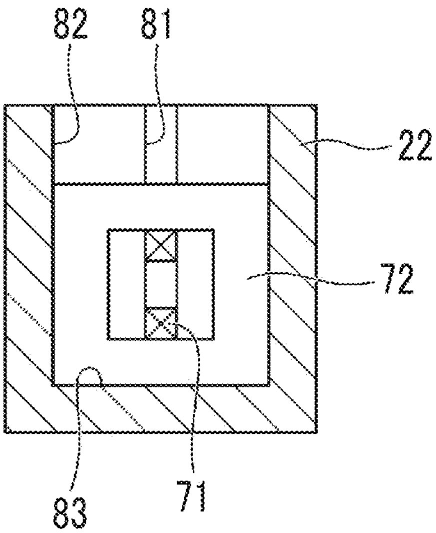
FIG. 5 is a cross-sectional view taken along line V-V of FIG. 3.

As shown in FIG. 5, the second insertion point 82 is a groove that extends in the first axis line A1 direction and is recessed in the third axis line A3 direction. In a case of being viewed from the third axis line A3 direction, the second insertion point 82 has a rectangular shape corresponding to the projection shape of the second coil 72. The dimension of the second insertion point 82 in the first axis line A1 direction is set to be the same as or slightly larger than the dimension of the second coil 72. The dimension of the second insertion point 82 in the second axis line A2 direction is set to be the same as or slightly larger than the dimension of the second coil 72 in the second axis line A2 direction. The dimension of the second insertion point 82 in the third axis line A3 direction is set to be larger than the dimension of the second coil 72 in the third axis line A3 direction. That is, in a state in which the second coil 72 is inserted into the second insertion point 82, a space is formed on one side in the third axis line A3 direction of the second coil 72.

In addition, as shown in FIG. 4, a bottom surface (second bottom surface 83) of the second insertion point 82 is recessed from a bottom surface (first bottom surface 84) of the first insertion point 81 in the third axis line A3 direction. More specifically, the dimension in the third axis line A3 direction from the first bottom surface 84 to the second bottom surface 83 is set to be the same as or slightly larger than the protruding dimension of the second coil 72 with respect to the first coil 71. In addition, a distance dimension between a pair of surfaces (side surfaces 85) facing each other with the second bottom surface 83 interposed therebetween is the same as or slightly larger than the dimension of the second coil 72 in the second axis line A2 direction. A part of the second coil 72 is surrounded by the second bottom surface 83 and the pair of side surfaces 85 to be supported and fixed.

As shown in FIG. 3, the case 22 has an octagonal shape as viewed from the third axis line A3 direction. More specifically, end surfaces 91 of the case 22 on both sides in the first axis line A1 direction extend in a plane orthogonal to the first axis line A1. In addition, end surfaces 91 of the case 22 on both sides in the second axis line A2 direction extend in a plane orthogonal to the second axis line A2. It is desirable that the respective end edges of the case 22 as viewed from the third axis line A3 direction have the same dimensions. That is, it is desirable that the case 22 has a regular octagonal shape as viewed from the third axis line A3 direction. Meanwhile, in order to prevent the erroneous recognition of the posture of the case 22, a configuration in which the lengths of a pair of end edges adjacent to each other are different can also be adopted. In addition, in order to maximize the flexibility of the holding member 11, the case 22 can also be configured to have a circular shape as viewed from the third axis line A3 direction.

About Operation Method of Coil Module

Figure 6:
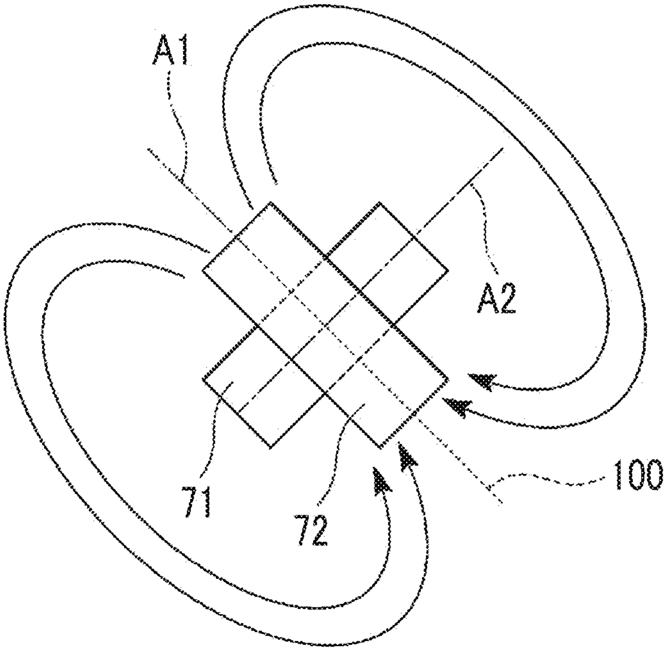
FIG. 6 is an explanatory diagram showing a relationship between a posture of the coil module according to the embodiment of the present disclosure and a direction of an eddy current, and is a diagram showing a direction of the eddy current generated by a mutual induction standard comparison method.
Figure 7:
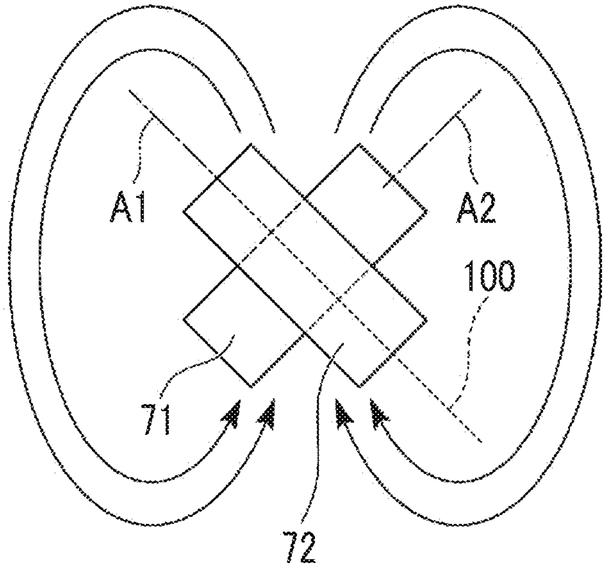
FIG. 7 is an explanatory diagram showing a relationship between a posture of the coil module according to the embodiment of the present disclosure and a direction of an eddy current, and is a diagram showing a direction of the eddy current generated by a self-induction self-comparison method.

Next, an operation method of the coil module 20 will be described with reference to FIGS. 6 and 7. In the coil module 20, two operating methods are selectable: the "mutual induction standard comparison method" and the "self-induction self-comparison method." The switching between these two methods is performed by appropriately changing a connection state of the wiring in the switch unit 30.

In the mutual induction standard comparison method, one of the first coil 71 and the second coil 72 is used as an excitation coil, and the other is used as a detection coil. The excitation coil generates eddy currents on a surface of the inspection site including the weld portion or the like. In a case where the crack or thinning occurs in the weld portion or the like, the disturbance occurs in the eddy current. The detection coil detects the disturbance of the eddy current. FIG. 6 shows a case where the second coil 72 is used as the excitation coil and the first coil 71 is used as the detection coil, as an example. As indicated by arrows in FIG. 6, the eddy currents form a plurality of arc shapes extending from one end side to the other end side in the first axis line A1 direction on the surface of the inspection site. In this case, the detection accuracy of flaws or cracks extending in a direction crossing the eddy current is improved. Meanwhile, for example, the detection accuracy of the flaw or the crack in the first axis line A1 direction indicated by a dotted line 100 in FIG. 6 is reduced.

In the self-induction self-comparison method, each of the first coil 71 and the second coil 72 operates as the excitation coil and also operates as the detection coil at the same time. That is, the method is a method of detecting the disturbance in the eddy current by oneself based on the eddy current generated by oneself. In this case, as shown in FIG. 7, the eddy currents flow in a plurality of arc shapes from one end side to the other end side in a direction intersecting the first axis line A1 direction and the second axis line A2 direction at 45° as viewed from the third axis line A3 direction. As a result, it is possible to ensure the detection accuracy of flaws or cracks extending in the first axis line A1 direction or the second axis line A2 direction, which are difficult to detect using the above-described mutual induction standard comparison method.

Operations and Effects

Next, an example of a method of using the eddy current testing device 1 and the probe array, which are above-described, will be described. In a case where the eddy current testing device 1 is used, first, the power supply unit 40 supplies an alternating current to each coil module 20 of the array probe 10. In addition, the switch unit 30 appropriately selects any one of the two operation methods described above. In this state, the array probe 10 is scanned along the surface of the pipe, the weld portion, or the like. In a case where the respective coil modules 20 detect a defective part, the data acquisition unit main body 50 specifies a position of the defect and checks the properties such as the depth and the length. More specifically, a position is specified by an encoder in the data acquisition unit main body 50, and the properties such as the depth and the length are acquired by analysis.

Here, in the related art, a method of alternately winding the winding of the excitation coil and the winding of the detection coil around the above-described winding frame has been adopted in order to manufacture the cross coil 21. That is, it is necessary to repeat the work of winding the winding of the excitation coil, and then winding the winding of the detection coil in a direction intersecting the excitation coil.

However, in a case where the cross coil 21 is manufactured using the above-described winding frame, it is difficult to automate the work, and problems arise such as an increase in cost required for manufacturing and an increase in manufacturing period. In particular, in a case of creating a probe for eddy current testing that requires a large number of cross coils 21, the delivery time of the cross coils 21 has become a significant bottleneck. Therefore, each of the above-described configurations is adopted in the present embodiment.

According to the above-described configuration, the coil module 20 can be easily manufactured by inserting the first coil 71 into the inside of the second coil 72 to assemble the cross coil 21, and then inserting the cross coil 21 into the first insertion point 81 and the second insertion point 82 of the case 22. In addition, a large number of coils having a simple annular shape can be manufactured at low cost and in a short delivery time through automation. Accordingly, it is not necessary to perform the work of alternately winding the winding around the winding frame as in the related art. As a result, it is possible to achieve both a significant reduction in manufacturing cost and a reduction in the period required for manufacturing.

Further, according to the above-described configuration, since the first insertion point 81 and the second insertion point 82 are open toward one side in the third axis line A3 direction, the cross coil 21 can be easily inserted into the case 22 through the opening. Accordingly, the work procedure is significantly simplified, and the number of steps required for assembly can be reduced. In addition, the shape and the posture of the cross coil 21 can be stably maintained only by inserting the cross coil 21 into the case 22. Accordingly, for example, it is possible to reduce the possibility that the cross coil 21 is damaged, deformed, or changed in posture due to an external force.

In addition, according to the above-described configuration, the second insertion point 82 is recessed by a height of the second coil 72 that protrudes to an outer peripheral side. That is, the second bottom surface 83 is located at a position recessed in the third axis line A3 direction with respect to the first bottom surface 84. Accordingly, in a state in which the cross coil 21 is inserted into the case 22, the second coil 72 is surrounded by the second bottom surface 83 and the pair of side surfaces 85 interposing the second bottom surface 83 therebetween. Therefore, the position of the second coil 72 is defined, and the possibility of occurrence of rattling or deviation of the posture of the second coil 72 can be reduced. As a result, in a case where the flaw detection work is performed, it is possible to significantly reduce the occurrence of noise caused by the rattling of the second coil 72. Accordingly, it is possible to improve the accuracy and efficiency of the flaw detection work.

Further, according to the above-described configuration, since the first coil 71 and the second coil 72 each have a rectangular annular shape, the area (facing area) of the region close to the flaw detection object, such as the pipe or the weld portion, can be increased, for example, as compared with a case where the first coil 71 and the second coil 72 have a circular annular shape. Accordingly, it is possible to generate eddy currents in a wider range and to detect the disturbance of the eddy currents in a wider range. Meanwhile, in a case where each coil has a circular annular shape, a region close to a pipe or the like is narrowed. As a result, since the region where the eddy current is generated is limited, the intensity of the eddy current is also reduced, and the defect detection properties of flaws and thinning are deteriorated. According to the above-described configuration, since such a disadvantage is eliminated, the flaw detection accuracy can be significantly improved in a case where the coil module 20 is applied to the flaw detection device.

In addition, according to the above-described configuration, the array probe 10 has an elastically deformable holding member 11. In other words, the holding member 11 has flexibility. That is, by pressing the holding member 11 against the curved surface of the pipe or the like, the holding member 11 is elastically deformed, and the entire array probe 10 can be brought into close contact with the curved surface. In this state, by performing the scanning with the coil module 20, it is possible to prevent the coil from floating in a region where the shape changes, such as the surface of the pipe, the elbow portion of the pipe, or the surface of the weld portion, and it is possible to ensure the defect detection property, In addition, according to the above-described configuration, the coil module 20 is inserted one by one into each insertion point 12 formed in the holding member 11. Accordingly, for example, in a case where any coil module 20 becomes defective, only the coil module 20 in which the defect has occurred can be taken out from the insertion point 12 and can be immediately replaced with a new one. Accordingly, it is possible to reduce the maintenance cost and the operation cost of the array probe 10.

In addition, according to the above-described configuration, since the positions of the probe columns 60 in the first arrangement direction D1 of the coil module 20 are different from each other, the coil modules 20 overlap each other and there is no gap in a case of being viewed from the second arrangement direction D2. Accordingly, in a case where the array probe 10 is moved in the second arrangement direction D2, a wider range in the first arrangement direction D1 is covered by each coil module 20. Accordingly, it is possible to uniformly scan the pipe, the weld portion, and the like over a wider range under a higher detection density.

In addition, according to the above-described configuration, the end surfaces 91 facing both sides in the first axis line A1 direction and the end surfaces 91 facing both sides in the second axis line A2 direction are chamfered. That is, the case 22 generates an octagonal shape as viewed from the third axis line A3 direction. Accordingly, in a case where the holding member 11 of the array probe 10 is elastically deformed, the corners of the case 22 do not interfere with each other. In particular, in a case where the array probe 10 itself is elastically deformed to be twisted, the corners do not interfere with each other, and thus the change in the shape of the array probe 10 is less likely to be hindered. Therefore, the ability of the array probe 10 to conform to the curved surface can be further improved. Accordingly, the array probe 10 can be applied to various curved surface shapes, and the general-purpose properties of the array probe 10 can be improved.

Further, according to the above-described configuration, since the eddy current testing device 1 includes the switch unit 30, the operation method of each of the first coil 71 and the second coil 72 can be switched. Accordingly, it is possible to change the direction in which the eddy current flows without changing the postures of the first coil 71 and the second coil 72. That is, it is possible to generate the eddy currents in various directions using the same array probe 10. By changing the direction of the eddy current according to the direction of the defective part (crack or thinning) of the pipe, the weld portion, or the like, it is possible to perform scanning and flaw detection with higher density and higher accuracy in response to various defective parts.

Other Embodiments

Although the embodiment of the present disclosure has been described in detail above with reference to the drawings, the specific configuration of the present disclosure is not limited to the embodiment, and the present disclosure includes design changes or the like without departing from the scope of the present disclosure.

Figure 8:
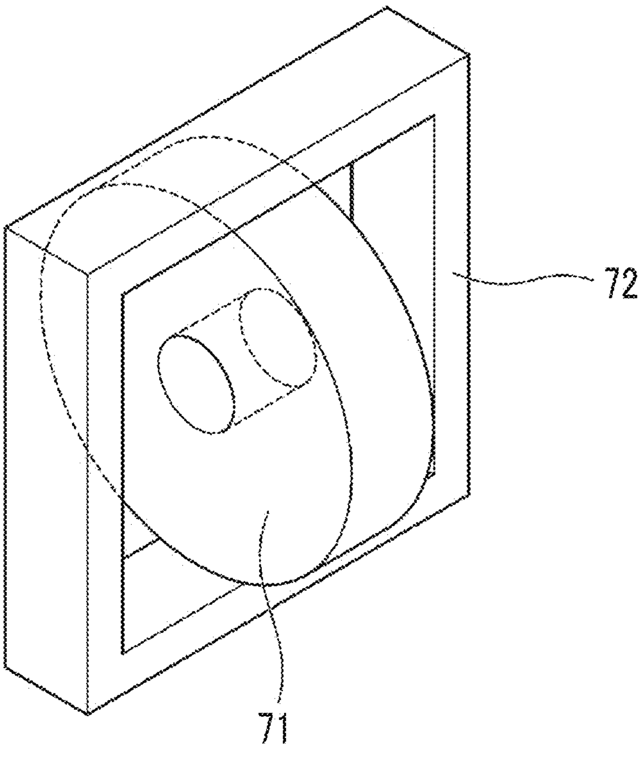
FIG. 8 is a perspective view showing a first modification example of the coil module according to the embodiment of the present disclosure.
Figure 9:
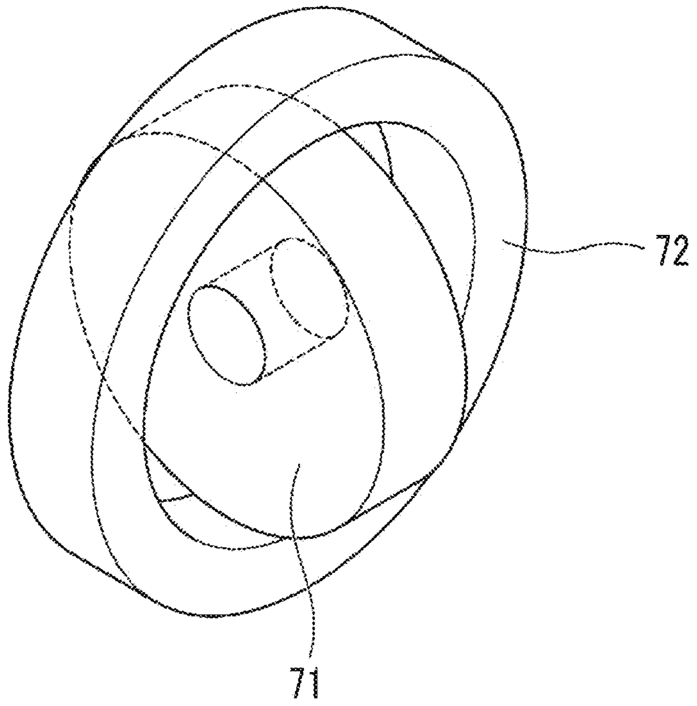
FIG. 9 is a perspective view showing a second modification example of the coil module according to the embodiment of the present disclosure.

For example, in the above-described embodiment, an example in which the first coil 71 and the second coil 72 of the cross coil 21 each have a rectangular annular shape has been described. However, the shape of the cross coil 21 is not limited to the above. As shown in FIG. 8 as a first modification example, the first coil 71 can be formed in a circular annular shape and the second coil 72 can be formed in a rectangular annular shape. In addition, as shown in FIG. 9 as a second modification example, both the first coil 71 and the second coil 72 can be formed in a circular annular shape. While either case can be applied to the cross coil 21, the shape described in the above embodiment is most advantageous in terms of the detection accuracy of defective parts.

APPENDIX

The coil module 20, the array probe 10, and the eddy current testing device 1 described in each embodiment are understood, for example, as follows.

(1) A coil module 20 according to a first aspect includes a cross coil 21 that includes a first coil 71 having an annular shape centered on a first axis line A1, and a second coil 72 having an annular shape centered on a second axis line A2 intersecting the first axis line A1 and covering a part of an outer peripheral side of the first coil 71, and a case 22 that includes a first insertion point 81 extending in a first axis line A1 direction and into which the first coil 71 is inserted and a second insertion point 82 extending in a second axis line A2 direction and into which the second coil 72 is inserted.

According to the above-described configuration, the coil module 20 can be easily manufactured by inserting the first coil 71 into the inside of the second coil 72 to assemble the cross coil 21, and then inserting it into the first insertion point 81 and the second insertion point 82 of the case 22. Accordingly, it is possible to achieve both reduction in manufacturing cost and shortening of delivery time.

(2) A coil module 20 according to a second aspect is the coil module 20 according to the first aspect, in which the first insertion point 81 and the second insertion point 82 are open toward one side in a third axis line A3 direction orthogonal to the first axis line A1 and the second axis line A2.

According to the above-described configuration, since the first insertion point 81 and the second insertion point 82 are open toward one side in the third axis line A3 direction, the cross coil 21 can be easily inserted into the case 22 through the opening. Accordingly, the number of steps required for assembly can be reduced.

(3) A coil module 20 according to a third aspect is the coil module 20 according to the second aspect, in which a bottom surface of the second insertion point 82 is recessed in the third axis line A3 direction from a bottom surface of the first insertion point 81 by a height of the second coil 72 in the third axis line A3 direction.

According to the above-described configuration, since the second insertion point 82 is recessed by the height of the second coil 72 protruding to the outer peripheral side, it is possible to reduce the possibility of occurrence of rattling or deviation of the posture of the second coil 72 in a state in which the cross coil 21 is inserted into the case 22.

(4) A coil module 20 according to a fourth aspect is the coil module 20 according to any one of the first to third aspects, in which the first coil 71 has a rectangular annular shape centered on the first axis line A1, and the second coil 72 has a rectangular annular shape centered on the second axis line A2.

According to the above-described configuration, since the first coil 71 and the second coil 72 each have a rectangular annular shape, the area (facing area) of the region close to the flaw detection object, such as the pipe or the weld portion, can be increased, for example, as compared with a case where the first coil 71 and the second coil 72 have a circular annular shape. As a result, it is possible to improve the flaw detection accuracy in a case where the coil module 20 is applied to the flaw detection device.

(5) An array probe 10 according to a fifth aspect includes a plurality of the coil modules 20 according to any one of the first to fourth aspects that are arranged in a first arrangement direction D1 intersecting the first axis line A1 and the second axis line A2 and extending in the same plane, and a holding member 11 that supports the plurality of coil modules 20 and is formed of an elastically deformable material.

According to the above-described configuration, by pressing the holding member 11 against the curved surface of the pipe, the weld portion, or the like, the holding member 11 is elastically deformed, and the entire array probe 10 can be brought into close contact with the curved surface. By performing scanning with the coil module 20 in this state, it is possible to perform the flaw detection with higher accuracy.

(6) An array probe 10 according to a sixth aspect is the array probe 10 according to the fifth aspect, in which the holding member 11 has a plurality of insertion points 12 into which the coil modules 20 are inserted.

According to the above-described configuration, since the coil modules 20 are inserted one by one into each insertion point 12, for example, in a case where any coil module 20 becomes defective, only the coil module 20 in which the defect has occurred can be taken out from the insertion point 12 and can be immediately replaced with a new one. Accordingly, it is possible to reduce the maintenance cost and the operation cost of the array probe 10.

(7) An array probe 10 according to a seventh aspect is the array probe 10 according to the fifth or sixth aspect, and has a plurality of probe columns 60 arranged in a second arrangement direction D2 orthogonal to the first arrangement direction D1 together with the plurality of the coil modules 20 and the holding member 11, and in a pair of the probe columns 60 adjacent to each other in the second arrangement direction D2, positions of the coil modules 20 in the first arrangement direction D1 are different from each other.

According to the above-described configuration, since the positions of the probe columns 60 in the first arrangement direction D1 of the coil module 20 are different from each other, the coil modules 20 overlap each other and there is no gap in a case of being viewed from the second arrangement direction D2. Accordingly, the coil module 20 can scan the weld portion, the pipe, and the like without floating over a wider range in the first arrangement direction D1.

(8) An array probe 10 according to an eighth aspect is the array probe 10 according to any one of the fifth to seventh aspects, in which an end surface 91 facing both sides in the first axis line A1 direction extends in a plane intersecting the first axis line A1, and an end surface 91 facing both sides in the second axis line A2 direction extends in a plane intersecting the second axis line A2, in the case 22.

According to the above-described configuration, the end surfaces 91 facing both sides in the first axis line A1 direction and the end surfaces 91 facing both sides in the second axis line A2 direction are chamfered. That is, the case 22 generates an octagonal shape as viewed from the third axis line A3 direction. Accordingly, in a case where the holding member 11 of the array probe 10 is elastically deformed, the corners of the case 22 do not interfere with each other. Therefore, the ability of the array probe 10 to conform to the curved surface can be further improved.

(9) An eddy current testing device 1 according to a ninth aspect includes the array probe 10 according to any one of the fifth to eighth aspects, a power supply unit 40 that supplies an alternating current to each of the first coil 71 and the second coil 72, and a switch unit 30 that switches a supply state of the alternating current between a mutual induction standard comparison method in which one of the first coil 71 and the second coil 72 operates as an excitation coil that generates an eddy current and the other operates as a detection coil that detects a flaw due to a disturbance of the eddy current, and a self-induction self-comparison method in which each of the first coil 71 and the second coil 72 operates as the excitation coil that generates the eddy current and as the detection coil that detects the flaw due to the disturbance of the eddy current.

According to the above-described configuration, since the switch unit 30 is included, the operation method of each of the first coil 71 and the second coil 72 can be switched. Accordingly, it is possible to change the direction in which the eddy current flows without changing the postures of the first coil 71 and the second coil 72. By changing the direction of the eddy current according to the direction of the defective part (crack or thinning) of the pipe, the weld portion, or the like, it is possible to perform scanning and flaw detection in response to various defective parts.

INDUSTRIAL APPLICABILITY

The present disclosure relates to a coil module, an array probe, and an eddy current testing device that can be manufactured at a low cost and in a short time.

REFERENCE SIGNS LIST

1: eddy current testing device
10: array probe
11: holding member
12: insertion point
20: coil module
21: cross coil
22: case
30: switch unit
40: power supply unit
50: data acquisition unit main body
60: probe column
71: first coil
72: second coil
81: first insertion point
82: second insertion point
83: second bottom surface
84: first bottom surface
85: side surface
91: end surface
100: dotted line
A1: first axis line
A2: second axis line
A3: third axis line
D1: first arrangement direction
D2: second arrangement direction

The invention claimed is:

1. A coil module comprising:
a cross coil that includes
a first coil having an annular shape centered on a first axis line, and
a second coil having an annular shape centered on a second axis line intersecting the first axis line and covering a part of an outer peripheral side of the first coil; and
a case that includes
a first insertion point extending in a first axis line direction and into which the first coil is inserted and
a second insertion point extending in a second axis line direction and into which the second coil is inserted.

2. The coil module according to claim 1, wherein the first insertion point and the second insertion point are open toward one side in a third axis line direction orthogonal to the first axis line and the second axis line.

3. The coil module according to claim 2, wherein a bottom surface of the second insertion point is recessed in the third axis line direction from a bottom surface of the first insertion point by a height of the second coil in the third axis line direction.

4. The coil module according to claim 1, wherein the first coil has a rectangular annular shape centered on the first axis line, and the second coil has a rectangular annular shape centered on the second axis line.

5. An array probe comprising:
a plurality of the coil modules according to claim 1 that are arranged in a first arrangement direction intersecting the first axis line and the second axis line and extending in the same plane; and
a holding member that supports the plurality of coil modules and is formed of an elastically deformable material.

6. The array probe according to claim 5, wherein the holding member has a plurality of insertion points into which the coil modules are inserted.

7. The array probe according to claim 5, further comprising:
a plurality of probe columns arranged in a second arrangement direction orthogonal to the first arrangement direction together with the plurality of the coil modules and the holding member, wherein
in a pair of the probe columns adjacent to each other in the second arrangement direction, positions of the coil modules in the first arrangement direction are different from each other.

8. The array probe according to claim 5, wherein an end surface facing both sides in the first axis line direction extends in a plane intersecting the first axis line, and an end surface facing both sides in the second axis line direction extends in a plane intersecting the second axis line, in the case.

9. An eddy current testing device comprising:
the array probe according to claim 5;
a power supply unit that supplies an alternating current to each of the first coil and the second coil; and
a switch unit that switches a supply state of the alternating current between
a mutual induction standard comparison method in which one of the first coil and the second coil operates as an excitation coil that generates an eddy current and the other operates as a detection coil that detects a flaw due to a disturbance of the eddy current, and a self-induction self-comparison method in which each of the first coil and the second coil operates as the excitation coil that generates the eddy current and as the detection coil that detects the flaw due to the disturbance of the eddy current.

* * * * *